Patented Apr. 5, 1938

2,113,222

UNITED STATES PATENT OFFICE 2,113,222

WELDING ROD

Willy Rochocz, Baltimore, Md., assignor, by mesne assignments, to Jack Greenbaum, Baltimore, Md.

No Drawing. Application December 18, 1936, Serial No. 116,661

4 Claims. (Cl. 219—8)

This invention relates to welding and brazing and more particularly to welding rods and a process for their manufacture.

The principal object of the invention is to provide a welding rod, especially adapted for oxyacetylene welding and brazing cast iron, gray cast iron, malleable iron and chilled and other castings, but employing a relatively low working temperature.

Another important object is to provide a welding rod carrying a flux capable of welding seams which will have a much finer grain and a higher tensile strength than the parent metals, yet the welded part will remain soft and easily machineable, being without air bubbles or/and so-called hard spots.

Still another object is to provide a process for the manufacture of welding rods, particularly applicable for oxyacetylene welding and brazing, as distinguished from electric arc welding.

Other objects and advantages of the invention will be apparent during the course of the following detailed description of the novel welding rod and the process for its manufacture.

The body or flux-carrier of the novel welding rod may be a suitable length of material, such as a metallic rod, wire or tube, and the term "rod" will be employed to cover the body or carrier of the welding rod.

As for the flux, the preferred formula thereof is as follows, percentages being by weight:

| | Percent |
|---|---|
| Sodium carbonate | 45 |
| Borax | 45 |
| Carbon | 3 |
| Ferro-silicon | 2 |
| Gelatine | 2 |
| Silicate | 3 |

It should be noted that, while the above percentages are given, by way of example, for the production of the generally most desirable flux, the percentages may vary within reasonable limits.

In the manufacture of the welding rods, the above ingredients are well mixed together in a suitable container, brought to a temperature of substantially 100° C., and the scum carefully removed. The material is then allowed to cool to a temperature of about 70° C., whereupon the clean rods are, preferably, dipped therein, while the material is at substantially 70° C., and when a suitable volume of the material adheres thereto, they are hung up to dry. The material will become hard without baking or further treatment. When dry, a thin coating of graphite is desirably applied to the flux material upon the rods.

Apparently, this treatment, the ingredients employed and the percentages of these ingredients, provide a welding rod, particularly applicable for oxyacetylene welding and brazing, which will retain the flux material during shipment and storage of the welding rods, yet a cherry red heat is all that is required in order to employ the welding rod for welding and brazing, and there will be no air bubbles or so-called hard spots after the welding is completed.

In the use of the novel welding rod, after rust and dirt are removed from the surfaces to be welded, the surfaces are ground, if practical, to a V-shape. With the blow-pipe forming an angle of substantially 30° with the job, and the welding rod substantially normal to the job, a cherry red heat will provide a sufficient temperature to proceed with the welding. It is desirable that the job be covered after welding and the parts to cool slowly, but the desirable characteristics of the weld, as are made possible by the employment of this novel welding rod, are due to the combination of the specific flux and the process of manufacture of the welding rod.

Various changes may be made to the form of the invention herein described, and the process of manufacture, without departing from the spirit of the invention or the scope of the claims.

What is claimed is:

1. In an oxyacetylene welding rod, a metallic member carrying a flux consisting of substantially:—

| | Percent |
|---|---|
| Sodium carbonate | 45 |
| Borax | 45 |
| Carbon | 3 |
| Ferro-silicon | 2 |
| Gelatine | 2 |
| Silicate | 3 | said percentages being by weight.

2. An oxyacetylene welding rod comprising a metallic member, a flux coating adhering thereto, and a coating of graphite upon said flux coating.

3. The steps in the process of manufacturing an oxyacetylene welding rod which consists in mixing substantially:—

| | Percent |
|---|---|
| Sodium carbonate | 45 |
| Borax | 45 |
| Carbon | 3 |
| Ferro-silicon | 2 |
| Gelatine | 2 |
| Silicate | 3 | heating said mixture to substantially 100° C., reducing said temperature of said mixture to substantially 70° C., and applying said mixture at said reduced temperature to a suitable carrier, said carrier being the body of said welding rod.

4. A process of manufacturing an oxyacetylene welding rod which consists in mixing substantially:—

| | Percent |
|---|---|
| Sodium carbonate | 45 |
| Borax | 45 |
| Carbon | 3 |
| Ferro-silicon | 2 |
| Gelatine | 2 |
| Silicate | 3 | said percentages being by weight, heating said mixture to substantially 100° C., reducing said temperature to substantially 70° C., dipping a metallic rod therein, while said material is in substantially 70° C., until said rod acquires a coating of said mixture, removing said coated rod from said mixture, drying said coated rod, and coating said mixture upon said rod with graphite.

WILLY ROCHOCZ.